United States Patent [19]

Lemaitre

[11] 4,382,657
[45] May 10, 1983

[54] SEMI-FIXED ASTRONOMICAL MIRRORS AND ASPHERICAL GRATINGS AND METHODS FOR MANUFACTURING SAME BY ELASTIC FLEXION

[75] Inventor: Gérard R. Lemaitre, Aix-en-Provence, France

[73] Assignee: A.N.V.A.R., Paris, France

[21] Appl. No.: 217,440

[22] Filed: Dec. 17, 1980

[30] Foreign Application Priority Data

Dec. 20, 1979 [FR] France .................... 79 31632

[51] Int. Cl.³ .................... G02B 5/10; G02B 7/18; B29D 11/00; C03B 23/035
[52] U.S. Cl. .................... 350/295; 350/320; 350/310; 65/102; 65/107; 264/2.7; 264/1.9
[58] Field of Search ............... 350/295, 310, 296, 293, 350/320; 65/102, 107; 264/2.7, 1.9, 571, 553

[56] References Cited

U.S. PATENT DOCUMENTS

| | | | |
|---|---|---|---|
| 694,685 | 3/1902 | Sievert | 65/107 |
| 2,970,405 | 2/1961 | Giffen | 65/107 |
| 4,119,366 | 10/1978 | Lemaitre | 350/295 |

FOREIGN PATENT DOCUMENTS

| | | | |
|---|---|---|---|
| 46-21637 | 6/1971 | Japan | 65/107 |

*Primary Examiner*—Jon W. Henry
*Attorney, Agent, or Firm*—Bucknam and Archer

[57] ABSTRACT

The invention relates to astronomical mirrors or aspherical gratings which are obtained from a blank which is composed, in one piece, of a thin disc having a reflecting surface and of a cylindrical ring coaxial with the disc which is connected thereto by a semi-fixing. The ring is applied on a rigid support with which it defines a cavity in which a pressure pi is applied while the reflecting face is surfaced along a plane or spherical surface. The pressure pi is then varied, this causing a flexion of the disc.

6 Claims, 5 Drawing Figures

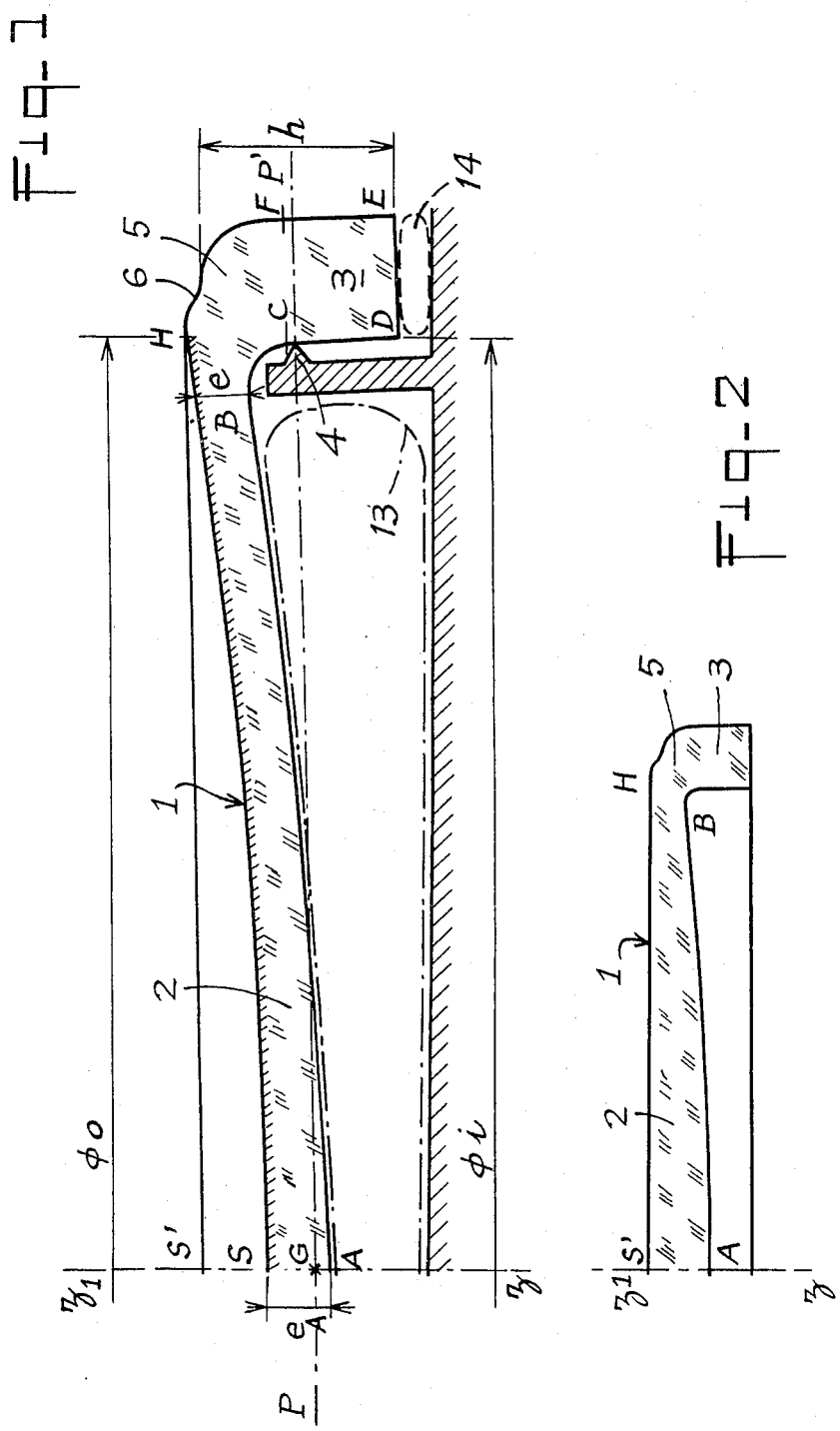

SEMI-FIXED ASTRONOMICAL MIRRORS AND ASPHERICAL GRATINGS AND METHODS FOR MANUFACTURING SAME BY ELASTIC FLEXION

The present invention relates to astronomical mirrors and aspherical gratings and to methods for manufacturing same by elastic flexion of a disc semi-fixed by its periphery.

The technical sector of the invention is that of manufacturing large aspherical mirrors and optical gratings, which are concave or convex, particularly parabolic, hyperbolic or spheroidal mirrors.

The slight elastic deformations of the thin plates have already been applied to the cutting of the mirrors to correct the spherical aberration, coma or astigmatism.

It has already been proposed to manufacture mirrors with with variable focal distance by subjecting a disc to stresses which deform it elastically whilst a spherical or plane surfacing of the reflecting face is effected then by releasing the stresses, or, inversely, by subjecting a disc to a stress which deforms it elastically after the plane or spherical surfacing of the reflecting face at rest. French Pat. No. 76 07577 describes mirrors with variable focal distance obtained by this process from a disc having a profile of determined thickness, which is supported by its periphery or by its centre and which is subjected either to a uniform load, or to a punctual load which provoke an elastic flexion of the disc around its supports.

It is an object of the present invention to provide processes for obtaining, by elastic deformation, aspherical astronomical mirrors, for example corrector mirrors of Schmidt catoptric telescopes or the large mirrors of parabolic telescopes or Chretien telescopes.

The casting and cutting of large monolithic glass mirrors whose diameter of aperture is greater than 5 or 6 meters, are very difficult and expensive.

One is moving, for the future, towards astronomical observation instruments which associate a plurality of mirrors or a plurality of telescopes (multi-telescopes) having mirrors of which the optimum aperture is between 1.5 and 2.5 m, this allowing a mass production of the mirrors. The development of this new generation of telescopes is associated with the reduction in weight and polishing time for each mirror.

One object of the present invention is to provide means for reducing the weight of material of the non-spherical mirrors coming within the composition of the astronomical apparatus, particularly telescopes intended for spatial astronomy.

Another object of the present invention is to obtain, with considerable accuracy, aspherical reflecting surfaces of large aperture, for example parabolic, hyperbolic or spheroidal surfaces, which may be concave or convex, from surfaces which are firstly polished along a spherical surface or along a plane surface, then elastically deformed to pass to an aspherical surface.

These objects are attained by means of astronomical mirrors or gratings, which are aspherical, comprising, on the one hand, one piece which is composed of a thin disc, having a reflecting face, which has been surfaced along a spherical or plane surface, of a cylindrical ring coaxial with said disc and of a zone of join which connects, by a semi-fixing, the periphery of said disc to an axial end of said ring which is located on the side of the disc opposite the reflecting face and it comprises, on the other hand, means for hermetically applying said ring on a rigid support with which said piece defines a cavity and means for varying the pressure pi in said cavity, so that the disc is subjected, during surfacing of the reflecting face, to a first differential pressure pi−pe, then to a second differential pressure p′i−pe different from the first which causes an elastic flexion of said disc semi-fixed by its periphery and which deforms said spherical or plane surface into a concave or convex aspherical surface, for example into a parabolic, hyperbolic or spheroidal surface.

The zone of join is defined on the inside by a fillet in the form of a quadrant, which connects the non-reflecting face of the disc to the inner face of said ring and on the outside by a rounded surface which connects the reflecting face of the mirror to the outer face of said ring and which is substantially homothetic with respect to said fillet.

The radius r of the quadrant-shaped fillet is connected to the diameter $\phi o$ of the reflecting face, to the inner diameter $\phi i$ of said ring and to the thickness e of the periphery of the disc by the equation:

$$\phi i = \phi o - \alpha e + \beta r,$$

where $\alpha$ and $\beta$ are constants whose value is between 0.4 and 1.5.

The thickness of the disc is slightly greater at the centre than at the periphery. The ratio between the thickness of the centre of the disc and the thickness at the periphery is between 1 and 1.5 and the thickness decreases from the centre towards the periphery in monotonic manner.

A mirror according to the invention is carried by supports which abut on the inner face of the ring near the join thereof and the quadrant shaped fillet.

A method for manufacturing an aspherical astronomical mirror of large aperture according to the invention comprises the following steps:

a blank in one piece is cast, comprising a thin disc whose periphery is connected to a concentric cylindrical ring by a zone of join forming a semi-fixing;

the outer face of the disc which is located on the side opposite said ring is polished, at rest, along a spherical or plane surface;

said ring is hermetically applied against a support surface which defines a cavity with said blank;

and a pressure pi, different from the outer pressure pe, is exerted inside said cavity, so that the disc bends elastically around its semi-fixed periphery and becomes aspherical.

The invention results in new astronomical mirrors, particularly concave or convex parabolic, hyperbolic or spheroidal mirrors, as well as new aspherical diffraction gratings.

The aspherical surface is obtained by polishing the reflecting face along a spherical surface, which operation is currently carried out with very high precision, of the order of $0.1\mu$, on surfaces having a diameter of aperture of the order of a plurality of meters. Spherical surfacing may be replaced by plane surfacing which is a particular case of a spherical surfacing of infinite radius.

After the plane or spherical surfacing has been effected, the pressure difference applied on the two faces of the thin disc is varied and said disc bends elastically around a neutral line which is located in the zone of join between the periphery of the disc and the ring. The thick ring is sufficiently rigid in order not to be deformed and the periphery of the disc, which constitutes the reflecting surface, is connected by a semi-fixing to the ring.

The laws of elastic deformation of a flexible disc fixed by its periphery and subjected to a uniformly distributed load are known and the thickness of the disc may therefore be calculated as a function of the diameter of aperture and the physical constants of the material so that, under the effect of a difference in pressure, a flexion is obtained which deforms the spherical or plane surface of the disc into a determined aspherical surface.

An advantage of the mirrors according to the invention with respect to conventional glass astronomical mirrors, lies in the fact that the axial height of the ring which surrounds the mirror is substantially equal to that of a conventional mirror of the same diameter and a large quantity of material is therefore saved, whilst obtaining a good total rigidity which protects the reflecting surface from the risks of deformation of the astigmatism type which might appear when the mirror is cut or supported in the telescope.

The invention will be more readily understood on reading the following description with reference to the accompanying drawings, in which:

FIG. 1 is an axial half-section of a concave aspherical astronomical mirror in the finished state.

FIGS. 2 and 3 show two successive steps in the manufacture of a mirror according to FIG. 1.

Figure 3:
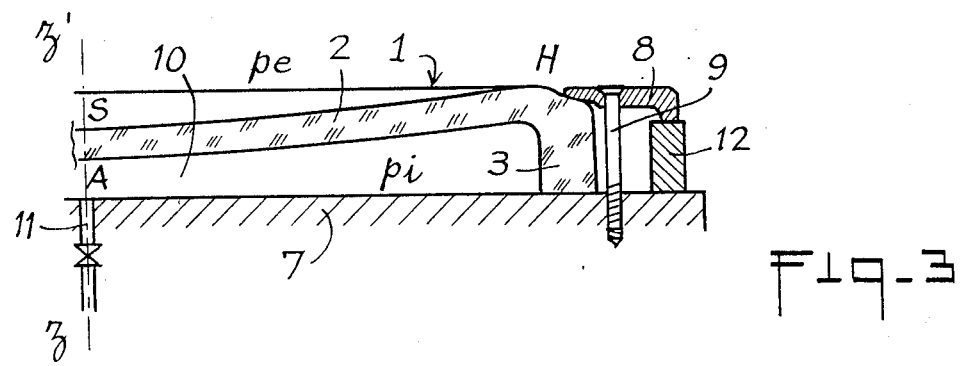

Referring now to the drawings, FIG. 1 shows a half-section of an aspherical astronomical mirror, for example a parabolic or hyperbolic mirror which is concave in the case of the Figure.

In the example according to FIG. 1, it is a mirror of revolution about an axis z zl. The optically active reflecting surface is surface SH having a diameter of aperture $\phi o$ which is for example between 1 m and 2.5 m. The surface SH may carry a diffraction grating.

To manufacture a mirror according to FIG. 1, a blank 1, for example made of glass and in one piece, is firstly shaped or cast in the form of the bottom of a vase. This blank 1 comprises a meniscus 2 having the form of a thin disc of axis z zl and of substantially constant thickness.

FIG. 2 shows, on a smaller scale, a blank 1 of axis z zl of which the outer face S'H of the disc 2 is a substantially plane face perpendicular to axis z zl, whilst the inner face AB is a substantially spherical surface of axis z zl of which the radius of curvature corresponds substantially to twice the focal distance f of the mirror which it is desired to manufacture. The outer face of this blank is machined in order to remove material firstly by milling, then is ground down by means of progressively finer grinding pastes to arrive, finally, at an outer surface SH visible in FIG. 3, which is a spherical surface having a radius of curvature R of the same order of size as that of the inner face. As a variant, the step shown in FIG. 2 may be avoided and a glass blank according to FIG. 3 may be cast or formed directly, of which the two faces of the disc are spherical.

In any case, the thickness of the disc 2 is relatively small for example of the order of 1 to 10 cm. When the blank is in the form shown in FIGS. 1 and 3, the ratio between the axial thickness $e_A$ and the thickness e at the periphery of the disc is between 1 and 1.5 and it varies between these limits as a function of the ratio of aperture, i.e. the ratio between the diameter $\phi o$ and the focal distance f.

For mirrors of small aperture $e_A$ is equal to e, whilst for more open mirrors the ratio eA/e increases with the ratio of aperture of the mirror.

In the case of the axial thickness eA being greater than the thickness e at the periphery, the thickness decreases in monotonic and continuous manner from the centre towards the periphery.

The blank 1 further comprises a cylindrical ring 3 which is centered on the axis z zl.

In FIG. 1, the ring 3 is included between letters C D E and F. The ring 3 is located on the side of the disc which is opposite the reflecting face SH which constitutes the optically active part of the mirror.

FIG. 1 shows the centre of gravity G of the blank and the trace of the plane PP' passing through the centre of gravity G and perpendicular to the axis z zl. The addition of a ring 3 to the mirror has for its effect to displace the centre of gravity G and the plane PP' rearwardly. The mass of the ring 3 is calculated so that it substantially balances the mass of the disc 2, so that the plane PP' intersects the ring 3 near the join thereof with the curved surface CB and the mirror is carried laterally by supports 4 which are distributed along the inner periphery of the ring 3 and which are located in the plane PP'.

The axial height h of the periphery of the mirror corresponds substantially to that of a conventional mirror of the same diameter $\phi o$, which clearly shows the saving of material obtained by mirrors according to the invention. The radial thickness DE of the ring is included between once and twice the axial thickness $e_A$ of the mirror. The blank 1 finally comprises a zone of join 5 which connects the periphery of the disc 2 to the axial end CF of the ring 3, by a semi-fixing. This zone of join is defined on the inner side by a surface BC of which the section through axial planes presents the form of a quadrant-shaped fillet tangential at B to the rear face of the disc 2 and, in the case of FIG. 1, tangential at C to the ring 3. The zone of join 5 is externally defined by a surface of which the section HF through axial planes presents a rounded form substantially homothetic with respect to surface BC. The form of the axis HF may vary slightly without this notably modifying the deformation in flexion of the disc 2. In particular, the surface HF may present a peripheral shoulder 6 of which the function will be explained with reference to FIG. 3.

FIG. 3 shows the following step of manufacture of an aspherical mirror according to the invention.

The outer face of the ring 3 is perfectly ground and is placed on a table 7. It is maintained hermetically applied against the table 7 by stirrup members 8 which abut on the shoulders 6 and on shims 12 and by screws 9 which are screwed in the table 7. Of course, this hermetic mode of fixing is given only by way of example and may be replaced by any equivalent fixing device.

When the blank 1, in the form of a vase bottom, has been hermetically applied on the table 7, it defines therewith a tight cavity 10.

The support 7 comprises one or more conduits 11 which are connected to a source of gas at a pressure pi different from the outer pressure pe, which is for example atmospheric pressure. Known means, for example a pressure reducer, enable the pressure pi to be varied.

In a first step, the pressure pi is adjusted to a first value different from pe so that the disc 2 is subjected to a uniformly distributed load equal to the differential pressure pi−pe. The pressure pi may be greater than or lower than pressure pe.

Under the action of this load, the disc 2 which is semi-fixed by its periphery on the ring 3, bends. Of course, the difference in pressure pi−pe is chosen so that the deformations of the disc 2 remain within the domain of elastic deformations. For example, a pressure difference pi−pe of between 0.05 bar and 1 bar is chosen.

Once the disc is bent, the outer face SH is subjected to the usual operations of surfacing and polishing of the reflecting face of a spherical mirror to obtain a perfectly spherical surface SH with a very high precision of the order of $0.1\mu$ which is the usual precision of astronomical mirrors.

When these surfacing operations are terminated, the pressure pi is varied so that, for example, the difference pi−pe is reduced or even annuled. This results in a reduction in the load which was exerted on the disc 2 and an elastic relaxation thereof which transforms the spherical reflecting surface SH into an aspherical surface. The pressure difference pi−pe is preferably not annulled entirely and a counter-pressure p'i−pe of between 0 and 0.02 bar is conserved in the state of use of the mirror, which exerts on the rear face of the mirror a slight thrust which is calculated to balance the actual weight of the disc 2.

When the mirror is mounted on the telescope, this balancing counter-pressure may be obtained by supporting the rear face A B C of the disc by a deformable bag element 13 which is inflated to a pressure p'i calculated to balance the actual weight of the disc. The rear face D E of the ring 3 may also be supported by a supple ring 14 which is inflated under another pressure which substantially balances the actual weight of the ring and the zone of join.

As a variant, the outer face SH may be surfaced along a spherical surface, whilst the blank is not subjected to any pressure difference then, when the mirror is being used, a pressure pi different from atmospheric pressure pe may be exerted in the cavity 10.

FIGS. 2 and 3 show steps of manufacturing a concave aspherical mirror, by elastic deformation of a spherical mirror.

Figure 4:
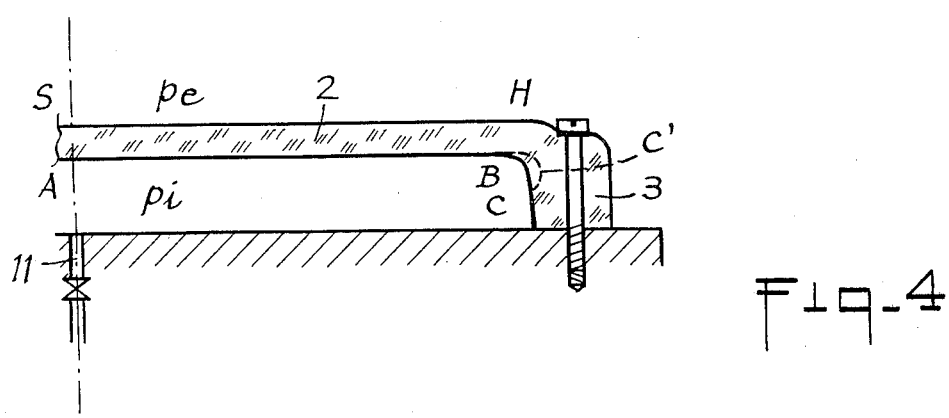
FIG. 4 shows a variant embodiment of a mirror according to the invention.

FIG. 4 shows a variant in which a blank 1, having an outer face SH, is taken, and firstly subjected to a pressure difference pi−pe and surfaced along a plane after which the blank is subjected to a second state of stress by varying the difference pi−pe.

If, in this second state the difference p'i−pe is less than what it was during surfacing, the centre of the disc bends inwardly and a concave mirror is obtained. If, on the contrary, in the second state the differential pressure p'i−pe is increased, the centre of the disc is pushed outwardly and an aspherical mirror is obtained.

FIG. 4 shows a device for fixing the mirror on the table 7 which is different from that of FIG. 3 and which is constituted by screws 9 which pass through the ring 3. FIG. 4 also shows an embodiment of an aspherical mirror which does not have an asphericity of revolution about the axis z z1. This is the case for example of a mirror correcting Schmidt telescopes by reflexion which form part of the so-called non-centred optical systems.

To obtain a non-centred asphericity, a blank having a semi-fixing in elliptic form is taken. Such a fixing is obtained by making a deeper fillet BC in the direction of the large axis of the ellipse.

FIG. 4 shows in solid lines the fillet BC at the ends of the small axis of the ellipse and, in broken lines, the fillet BC' at the ends of the large axis of the ellipse. For the intermediate positions between the large axis and the small axis of the ellipse, the surface BC is intermediate between the two fillets BC and BC'. All these fillets have the same radius r. Of course, the reflecting face SH and the ring 3 may also present an elliptic form.

Figure 5:
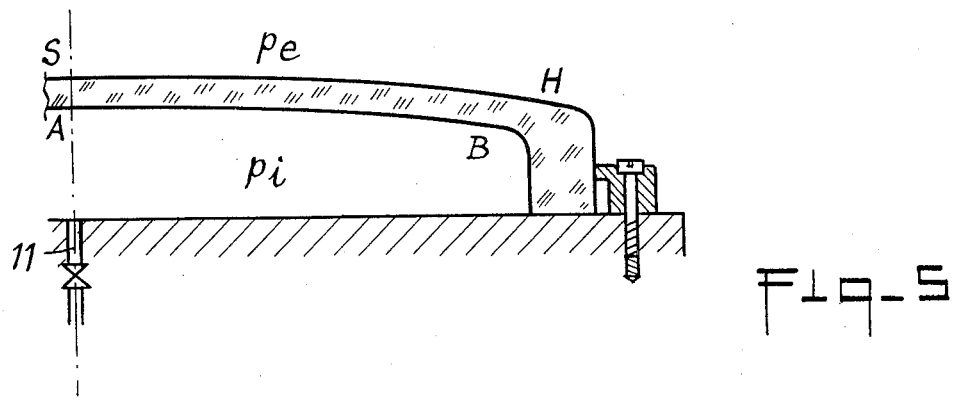
FIG. 5 shows a variant embodiment of a convex mirror.

FIG. 5 shows a variant embodiment according to which the outer face SH is firstly surfaced along a convex spherical surface in a first state of load pi−pe, then there is passage to a second state of load p'i−pe, so that the flexion of the spherical surface transforms the latter into a likewise convex parabolic or hyperbolic surface. This process is applicable for example to the manufacture of the secondary mirrors of telescopes (Cassegrain, Strand, etc. mirror).

When a pressure difference which constitutes a uniformly distributed load is applied to the discs 2 of the mirrors of the invention, the disc, which is relatively thin, bends around its periphery, which constitutes a semi-fixing. It is not a real fixing since the ring 3 undergoes a slight rotation about a circular neutral line and the conditions at the limits are translated by a semi-fixing. This semi-fixing is not a hindrance in controlling the geometry of the deformation. The rate of fixing is taken into consideration to regulate the intensity of the uniform load applied on the active part.

The mirrors according to the invention used in telescopes have an inclination which varies and the risk of the forces of gravity deforming the reflecting surface must be avoided. To this end, it has been seen that a light, uniformly distributed load is exerted, in service, against the rear face of the mirror to balance the actual weight of the disc and this load may easily be controlled by the zenith distance of the star observed.

In the mirrors according to the invention, the role of the fillet BC in the form of a quadrant is very important. It is this fillet which makes it possible to fix a determined polynomial form of the camber obtained during elastic deformation, this polynomial form being the one imposed by optical calculation.

Moreover, this fillet very considerably reduces the concentrations of stresses and it enables the processes according to the invention to be applied to the making of glass mirrors.

The determination of the radius of curvature r of the filet BC is essential to allow the mirror to be laterally supported in the telescope by supports 4 abutting on the inner part of the ring 3.

For a mirror of optical diameter $\phi o$, of the peripheral thickness e and whose ring 3 has an inner diameter $\phi i$, it has been established that the following equation had to be respected:

$$i = \phi o - \alpha e + \beta r$$

in which $\alpha$ and $\beta$ are constants without dimension which do not depend, at first approximation, on the Poisson coefficient of the material and which are between 0.4 and 1.5.

The method of manufacturing aspherical mirrors according to the invention makes it possible to obtain, by elastic deformation, the most severe tolerances which are imposed for the surfacing of optical surfaces for the ultraviolet. The mirrors according to the invention are particularly suitable to obtain aspherical surfaces not having a symmetry of revolution and, moreover, they present the advantage of being lighter than conventional mirrors. These properties leas the mirrors according to the invention to be particularly suitable for the construction of telescopes intended for spatial astronomy, particularly for the construction of the future spatial telescopes which must watch the sky in determined wave lengths. These preliminary tests show that a resolution greater than 1" of arc may be obtained with mirrors according to the invention having an aperture as large as f/2.

Blanks according to the invention may also be used to copy aspherical mirrors or diffraction gratings which may either be engraved gratings or halographic gratings disposed on a plane or spherical surface. In this case, the face SH of the blank is applied on the network to take an impression thereof. The blank may or may not be under stress during this operation. The blank is then separated. The blank is then subjected to a state of stress different from the one to which it was subjected during copying, so that a new aspherical grating is obtained by elastic deformation. This new aspherical grating may be reproduced in large numberson rigid supports.

From the foregoing, the artisan will understand that the invention provides an astronomical mirror which comprises a unitary disc having a reflecting face, and ring, means hermetically connecting such ring to a rigid support with which the disc and ring define a cavity; and means for adjusting the pressure $P_i$ in the cavity in relation to the absolute external pressure $P_e$, such that a pressure differential is established to deform the disc so that the reflecting face which was spherical or plane is deformed into an aspherical surface. The ring is generally cylindrical and coaxial with the disc and a junction zone connects the periphery of the disc to an axial end of the ring which is located on the side of the disc opposite the reflecting face thereof.

The various elements constituting the mirrors which have just been described by way of example may, of course, be replaced by equivalent elements fulfilling the same functions, without departing from the scope of the invention.

What is claimed is:

1. An astronomical mirror which comprises a thin disc having a reflecting face which has been surfaced along a spherical or plane surface and polished, a cylindrical ring coaxial with said disc and a junction zone that connects the periphery of said disc to an axial end of said cylindrical ring, said cylindrical ring being located on the side of the disc opposite to said reflecting face; said mirror further including means hermetically applying said cylindrical ring to a rigid support with which said thin disc and said cylindrical ring define a cavity; and means for adjusting the pressure $P_i$ in said cavity in relation to the external pressure $P_e$ such that a differential pressure is established to deform said spherical or plane reflecting face into an aspherical surface; said junction zone being defined on its outer side by a rounded surface that connects the periphery of said reflecting face to the outer surface of said cylindrical ring and on its inner side by a fillet in the form of a quadrant surface that connects the periphery of the face of said thin disc which is opposite to said reflecting face to the inner surface of said ring.

2. An astronomical mirror according to claim 1 wherein the thickness of said disc decreases progressively from its center towards its periphery and the ratio between the thickness of said disc at its center and at its periphery is between 1 and 1.5.

3. An astronomical mirror according to claim 1, wherein said rigid support extends inside said ring in engagement therewith.

4. An astronomical mirror according to claim 1, including an inflatable member positioned for engagement with the underside of said disc to at least partially counterbalance the weight thereof, and an inflatable member positioned for engagement with the underside of said ring to at least partially counterbalance the weight thereof.

5. A method for manufacturing an aspherical astronomical mirror which comprises the following steps:
   (a) casting a unitary thin disc and cylindrical ring piece in which said thin disc is connected at its periphery by a junction zone to said cylindrical ring coaxial to said disc;
   (b) applying said disc hermetically against a support surface to define therebetween a cavity;
   (c) adjusting the pressure in said cavity to a first value and then surfacing the outer face of said disc, which is opposite to said cylindrical ring, along a spherical or plane surface while maintaining said pressure at said first value;
   (d) polishing said outer spherical or plane surface in order to create a reflective surface;
   (e) and then adjusting said pressure in said cavity to a second value to elastically deform said spherical or plane reflective surface into an aspherical surface.

6. An astronomical mirror which comprises a thin disc having a reflecting face which has been surfaced along a spherical or plane surface and polished, a cylindrical ring coaxial with said disc and a junction zone that connects the periphery of said disc to an axial end of said cylindrical ring, said cylindrical ring being located on the side of the disc opposite to said reflecting face; said mirror further including means hermetically applying said cylindrical ring to a rigid support with which said thin disc and said cylindrical ring define a cavity; and means for adjusting the pressure $P_i$ in said cavity in relation to the external pressure $P_e$ such that a differential pressure is established to deform said spherical or plane reflecting face into an aspherical surface; said junction zone being defined on its outer side by a rounded surface that connects the periphery of said reflecting face to the outer surface of said cylindrical ring and on its inner side by a fillet in the form of a quadrant surface that connects the periphery of the face of said thin disc which is opposite to said reflecting face to the inner surface of said ring; said quadrant surface of the fillet having a radius r, said disc having a peripheral thickness e, said disc reflecting face having a diameter $\phi_o$, and said ring having an inner diameter $\phi_i$ that are interrelated by the formula:

$$\phi_i = \phi_o - \alpha e + \beta r$$

wherein $\alpha$ and $\beta$ are constants whose value is between 0.4 and 1.5.

* * * * *